Jan. 28, 1969  H. F. WAHL  3,424,295
CONVEYOR APPARATUS
Filed Dec. 8, 1965  Sheet 1 of 5
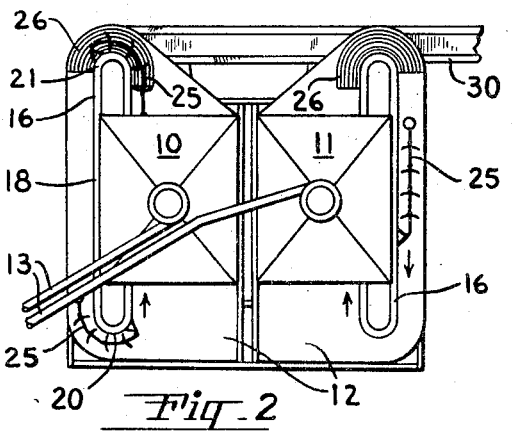
Fig. 2
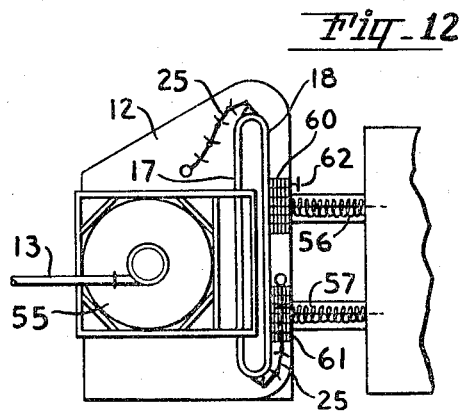
Fig. 12
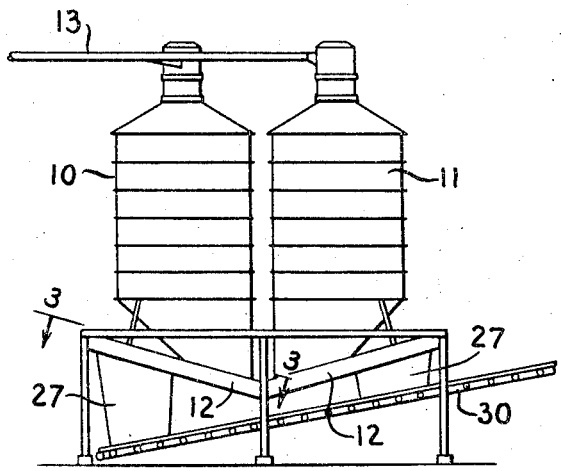
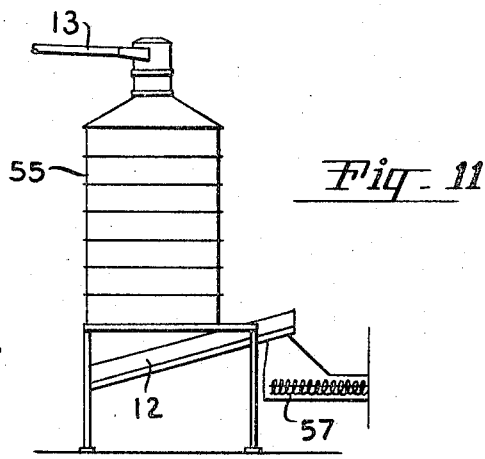
Fig. 11
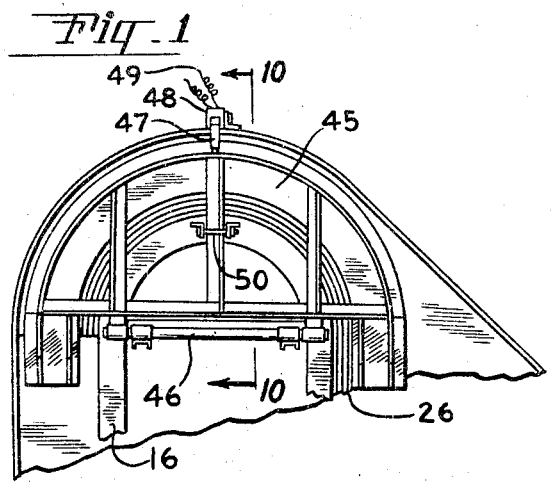
Fig. 1
Fig. 9
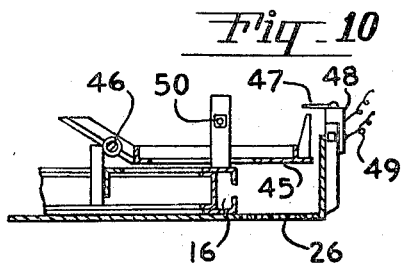
Fig. 10
INVENTOR.
HAROLD F. WAHL
BY
Attorney

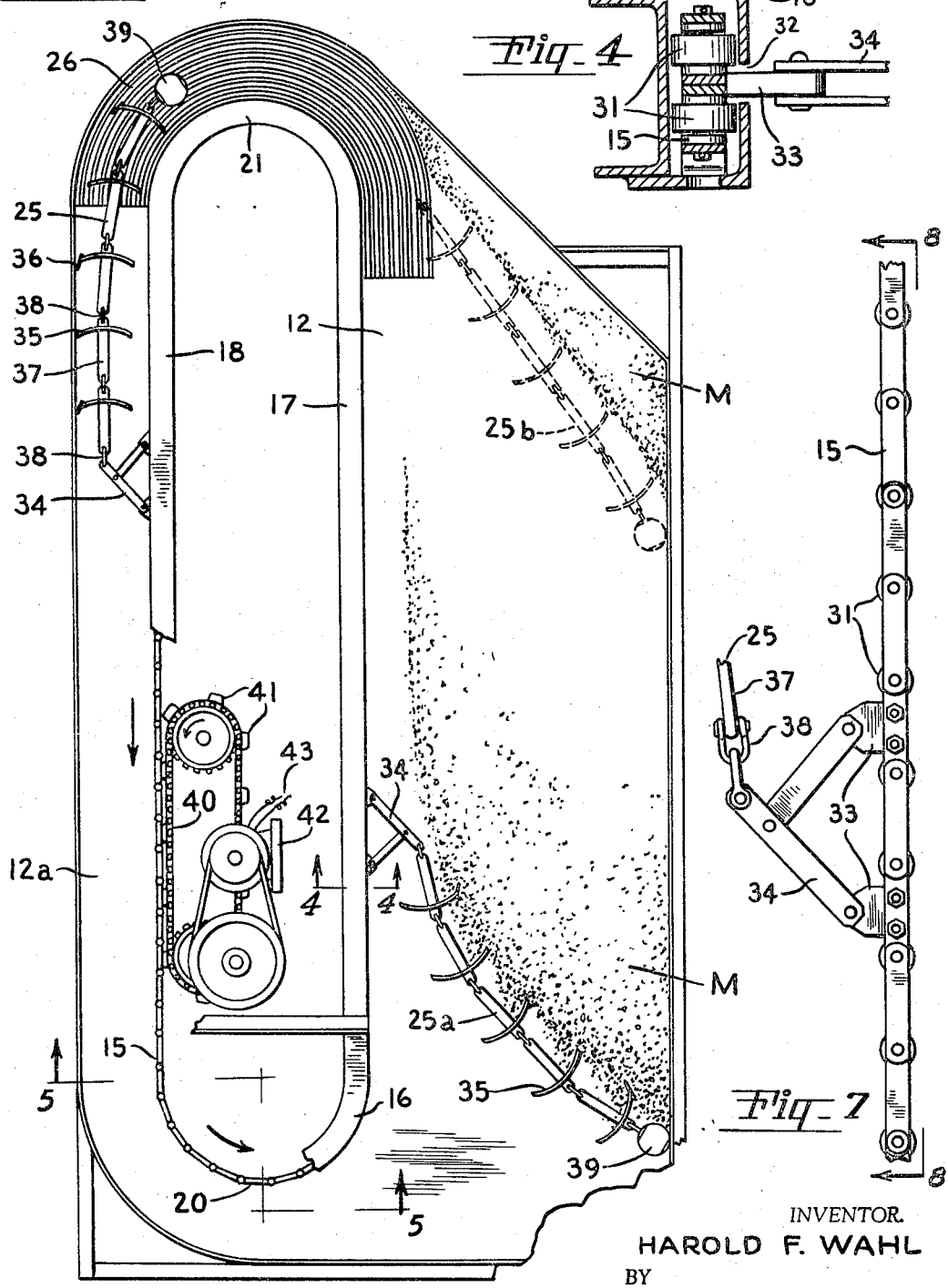

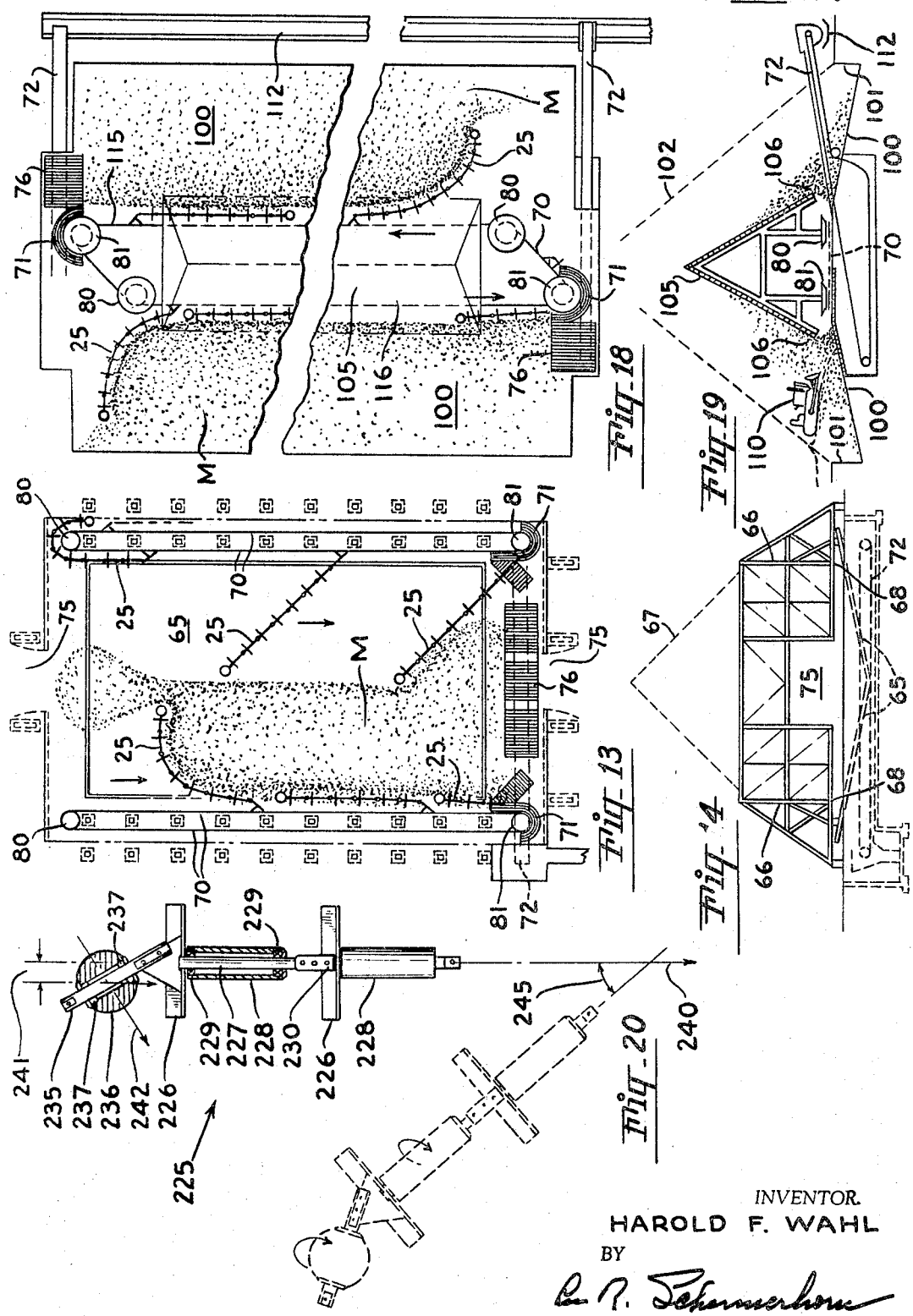

United States Patent Office 3,424,295
Patented Jan. 28, 1969

3,424,295
CONVEYOR APPARATUS
Harold F. Wahl, Portland, Oreg., assignor to Radar Pneumatics Incorporated, Portland, Oreg., a corporation of Oregon
Filed Dec. 8, 1965, Ser. No. 512,294
U.S. Cl. 198—170          9 Claims
Int. Cl. B65g 19/16

ABSTRACT OF THE DISCLOSURE

A reclaiming conveyor having a plurality of flexible sweep drags connected at their leading ends to an endless pull chain. The drags slide on a supporting surface for a pile of material to be removed and have free trailing ends which swing out away from the pull chain and impact against the material to engage and convey it. In order to swing the trailing ends against the material the supporting surface may be sloped away from the pull chain and/or a heavy rolling ball may be mounted on the trailing end of each drag.

---

This invention relates to a novel conveyor apparatus and has particular reference to an improved digging conveyor for removing material from a storage pile or other accumulation of material.

The invention is applicable to dry, bulk, particulate material which may be piled for storage, such as wood chips, hog fuel, coal and chemicals and, also, moist or wet material such as accumulated sludge in a sedimentation tank. Materials of particulate type may repose in unconfined open piles or heaps or they may be contained in storage bins and the like. With such materials there exists the problem of maintaining continuous transfer of the material. The common types of conveyor systems located in fixed positions under the pile, as in conventional live bottom bins, are unsatisfactory because the material frequently develops a characteristic bridging action which interrupts the steady flow of the material to the conveyor.

Previous attempts to overcome the bridging action and maintain steady flow have other disadvantages for many purposes. Some are very costly to install and operate, some are limited to circular piles or bins and some are incapable of operating on a first-in and first-out basis. It is often desirable to allow the material to age for a time in the pile and not remove the last material added to the pile while other material remains undisturbed indefinitely in the pile. It is also often desired to provide for the use of a tractor bulldozer to supplement the conveyor feed at times, to maintain the feeding operation in the event of conveyor failure, to re-distribute the pile, or for other purposes.

The general objects of the invention are, therefore, to provide conveyor apparatus which overcomes the disadvantages of conventional conveyors, to provide an improved storage and conveyor system and to provide an improved digging conveyor for transfer of material from a storage pile or other accumulation of material.

More particular objects are to provide a conveyor of the type described which is not subject to bridging, to provide a conveyor system which is applicable to a wide variety of materials, to provide a storage and conveyor system which is not limited to piles of any particular shape, to provide a storage and conveyor system for piles which may be elongated indefinitely in one direction, to provide a storage and conveyor system which may be operated on a first-in, first-out basis, to provide a system of the type described which will also allow for the use of a bulldozer, to provide a storage and conveyor system which usually does not have to start from a static position under a full load of bulk material as is the case with conventional live bottom bins, to provide a system of the type described which allows easy access for maintenance and to provide a digging conveyor which will discharge at a remote point.

The apparatus of the present invention comprises essentially an endless pull chain running adjacent one side of the pile or accumulation and having attached thereto at intervals a series of sweep drags with flights or scoops arranged to slide on a supporting surface and drag the material along such surface. Means are provided to cause the sweep drags to swing out from the pull chain and continuously dig into and remove material from the said one side of the pile or accumulation. Such means may comprise a supporting surface which slopes away from the pull chain so that the drags are swung away from the chain by gravity or they may comprise a ball on the trailing end of each drag having a roll axis oblique to the direction of pull to swing the drag away from the chain on a level supporting surface. The two means may be employed in combination, if desired.

Additional objects and advantages will become apparent and the invention will be better understood from the following description of certain preferred embodiments illustrated in the accompanying drawings. Various changes may be made, however, in the details of construction and arrangement of parts and certain features may be used without others. All such modifications within the scope of the appended claims are included in the invention.

In the drawings:

FIGURE 1 is an end elevation view of a first embodiment of material storage and conveyor system illustrating the principles of the invention;

FIGURE 2 is a top plan view of the embodiment in FIGURE 1;

FIGURE 3 is an enlarged view taken approximately on the line 3—3 of FIGURE 1 with parts broken away;

FIGURE 4 is an enlarged view taken on the line 4—4 of FIGURE 3;

FIGURE 7 is a top plan view showing a portion of the pull chain and sweep drag in FIGURE 3;

FIGURE 9 is a fragmentary view of the upper portion of FIGURE 3, showing certain features omitted in FIGURE 3;

FIGURE 10 is a view on the line 10—10 of FIGURE 9;

FIGURE 11 is an end elevation view of a second embodiment;

FIGURE 12 is a top plan view of the embodiment in FIGURE 11;

FIGURE 13 is a top plan view of a third embodiment;

FIGURE 14 is an end elevation of the embodiment shown in FIGURE 13;

FIGURE 18 is a top plan view with parts broken away, showing a fourth embodiment;

FIGURE 19 is an end elevation view of the embodiment shown in FIGURE 18; and

FIGURE 20 is a fragmentary top plan view with parts in section showing a second form of sweep drag.

Figure 6:
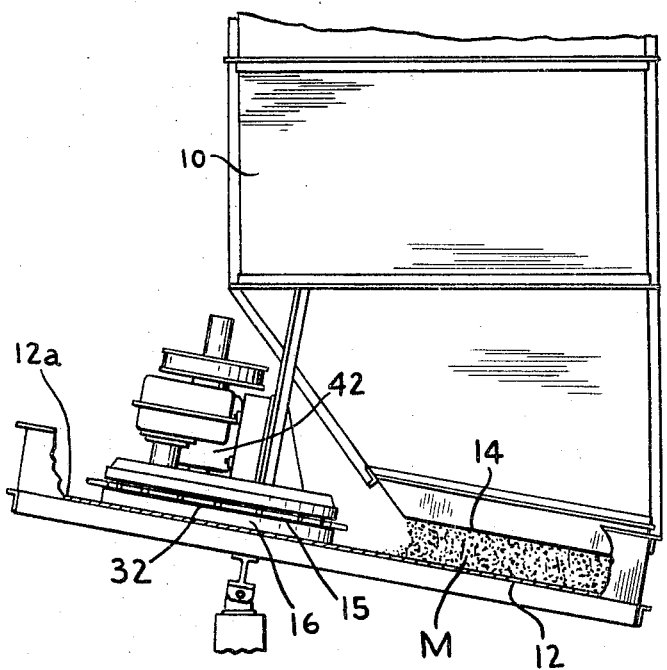
FIGURE 6 is an end elevation view of the apparatus in FIGURE 3 with parts broken away.

FIGURES 1 and 2 show a pair of storage bins 10 and 11 suitable for wood chips mounted over inclined material supporting surfaces 12. These bins are supplied by pneumatic conveyor tubes 13 or other suitable means. As shown in FIGURE 6, each bin has a lower edge 14 on its outer side and both ends a short distance above the supporting surface 12, forming a gap in which the material M in the bin is accessible for removal.

An endless pull chain 15 is mounted for travel in a slotted guide track 16 on supporting surface 12 adjacent each bin. As shown in FIGURE 2, the guide track 16 provides a lower or working reach 17 for the pull chain adjacent the bin edge 14 and a parallel upper or return reach 18. These reaches extend between two turning points 20 and 21 beyond opposite ends of the bins.

Each pull chain 15 pulls one or more sweep drags 25 around the circuit of guide track 16. In travelling along the lower working reach 17, these drags slide down inclined surface 12 away from the guide track 16 until they encounter the adjacent edge of the pile of material M which is exposed beneath the lower edge 14 of the bin, the edge 14 being high enough to allow the drags to pass thereunder. The two chains 15 pull the drags in the directions of the arrows in FIGURE 2 to discharge the material through gratings 26 at discharge points in supporting surface 12 adjacent the turning points 21. Underneath the gratings 26 are chutes 27 to deposit the material on conveyor 30.

As the drags 25 remove material from the edge of the pile, the material tends to form a bridge above the lower edge 14 of the bin, allowing the drags to work lower and lower along the surface 12 until finally the bridge collapses allowing the material to fall to the position shown in FIGURE 6. When such a bridge collapses, the buried drag continues to pull through the material and on the next pass the drags will follow the new edge of the pile so that the drags are continuously supplied with all the material that they can carry along with them. The material is incapable of bridging across the entire width of the open bottom of the bin whereby the bridges form and collapse repeatedly without impeding the rate of flow of material to the gratings 26. Thus, the rate of flow of the material may be closely regulated by adjusting the speed of pull chain 15. Variations in the feed rate may also be effected by changing the number of drags 25 on the pull chain and by changing the size and configuration of the drags.

Pull chain 15 is equipped with rollers 31 which travel in guide track 16 as shown in FIGURE 4. The guide track is slotted at 32 for the passage of lugs 33 which are connected with arms 34 to pull each drag 25 as shown in FIGURE 7. Each drag comprises a plurality of pivotally interconnected scooping and digging flights 35, as shown in FIGURE 3. The transverse portion of each flight is rigidly mounted near the trailing end of a rod 37. Clevises 38 provide pivotal connections between the rods and between the first rod and arms 34. Some or all of these flights may be equipped on their outer ends with digging teeth 36 for biting into densely packed or frozen material.

When necessary, a heavy metal ball 39 may be swivel mounted on the free trailing end of the drag to roll down the sloping surface 12 and swing the drag at an angle to chain 15 and into effective digging engagement with the material. If surface 12 hase sufficient slope, the drag will slide into engagement with the edge of the pile without requiring the ball 39. After each drag 25 has deposited its burden through the grating 26, it returns on supporting surface 12a along the return reach 18 of the guide track. The drags may take other forms, the present construction being merely illustrative.

In FIGURE 3, the drag 25a has just left turning point 20 and has wrapped itself partially around the end of the pile of material causing flights 35 to dig into the pile and remove material as the drag is pulled forward. When the bin is substantially empty, the drag will advance in the configuration shown in broken lines at 25b to sweep the whole width of material supporting surface 12. If desired, surface 12 may be extended in the region of grating 26 to receive lumps of frozen material or foreign objects accidentally present which are cast off by the drags so that such objects do not interfere with the operation of the drags.

Pull chain 15 may be driven by different means. In the first embodiment the driving means comprises a caterpillar chain 40 having outstanding drive lugs 41 arranged to enter openings in the chain 15 as shown in FIGURE 3. In the region of chain 40 the inside of guide track 16 is provided with a slot similar to the slot 32 for passage of the lugs 41 into the guide track. Caterpillar chain 40 is driven by an electric motor 42 having an energizing circuit 43. Suitable means are provided to regulate the speed of the chain 40.

It is desirable to provide a safety device for stopping motor 42 in case conveyor 30 should stop and allow chutes 27 to fill up with material so that no more material would pass through the gratings 26. A device for this purpose is shown in FIGURES 9 and 10. At the turning point 21 an arcuate plate 45 overlies the path of the drags 25 as they pass over grating 26. Drag flights 35 and ball 39 normally pass freely under the plate 45 as the flights lose their burden of material through the grating.

If the grating should become congested with material which has piled up in chutes 27, the drag flights 35 will begin to ride on top of the material until both these flights and the material lift the plate 45 on its pivot 46. Such upward movement trips an actuating finger 47 on a switch 48. Switch 48 is connected in a control circuit 49 which is arranged to deenergize motor circuit 43. Further details of the control circuit are not shown as such instrumentalities are fully understood by persons skilled in the art. If desired, suitable stop means such as pin 50 may be provided to limit the raising movement of plate 45.

FIGURES 11 and 12 show a modification having a single bin 55 for supplying one or the other of two feed conveyors 56, 57. In this embodiment there is no grating at the turning point of the pull chain but instead a pair of gratings 60 and 61 are spaced apart along the return reach 18, providing discharge points remote from the bin. The drags 25 carry their burden around the turning point 21 and normally deposit it through the first grating 60 into conveyor 56. When it is desired to switch the flow to conveyor 57, the grating 60 is closed by damper or valve means 62 causing the material to pass over this grating and be discharged through grating 61.

As an illustration of one use for such an arrangement, the conveyor 56 may feed fuel to a main boiler and the conveyor 57 may be used to feed fuel to a standby or alternate boiler which is used only when the main boiler is shut down. For additional alternate paths of flow, any number of gratings may be installed along the return reach 18 and equipped with closing means 62 so that the material will be deposited in any selected grating. Safety shut-off means similar to that shown in FIGURES 9 and 10 may be employed over each grating.

The modification shown in FIGURES 13 and 14 is an adaptation of the system in FIGURES 1 and 2 for open storage. Extending along opposite sides of the trough-shaped sloping floor 65 are opposite side walls 66 which will retain a pile of material to the maximum size indicated by broken line 67. Side walls 66 have lower edges 68 spaced above the floor 65. Sweep drags 25 on endless pull chains 70 may pass under the lower edges 68 to remove material from the edges of the pile as explained in connection with FIGURE 6, the chains 70 being outside of the walls.

As the pile becomes depleted, the drags will sweep out by gravity toward the bottom of the trough and continue to remove material from the edges of the pile. Such material is discharged through gratings 71 onto a transverse conveyor 72. Openings 75 are provided at both ends of the structure for the entrance of bulldozers when a pile is partially depleted. The bulldozers may push material onto the gratings 76 which are also located over the conveyor 72.

In this case the two digging conveyors operate on opposite sides of the same pile, which pile may be extended to a considerable distance in one direction by extending the pull chains 70. The digging conveyors may be operated alternately, removing material from one side of the pile while material is being added to the opposite side for ageing or drying. This referred to as a first-in, first-out operating sequence. In FIGURE 13 the right side of the pile has been substantially removed while the left side remains.

Figure 15:
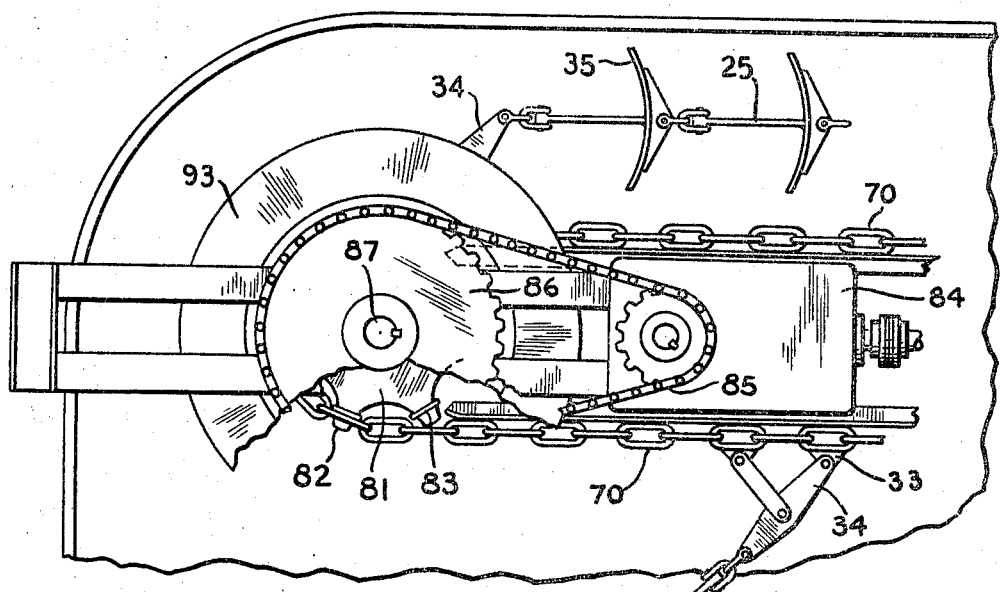
FIGURE 15 is an enlarged top plan view of the driving sprocket in FIGURE 13.
Figure 16:
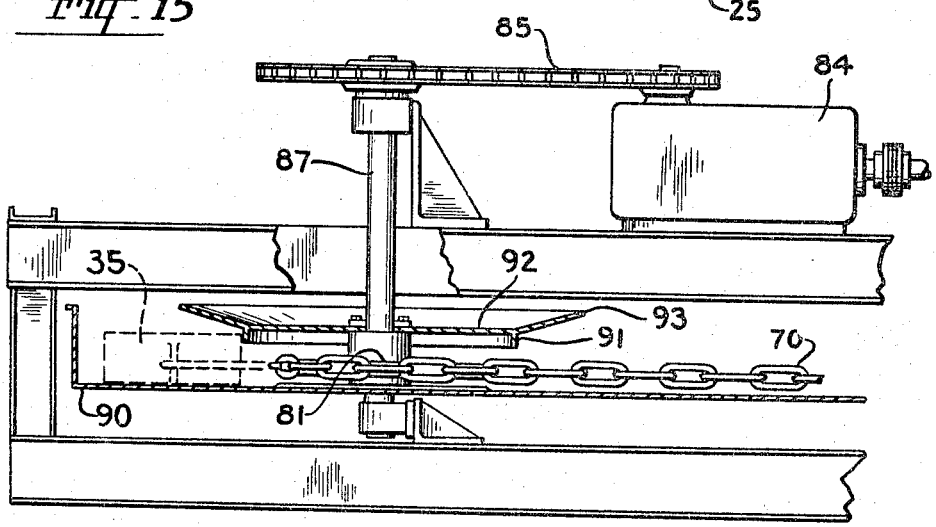
FIGURE 16 is a side elevation view of the sprocket in FIGURE 15 with parts broken away.

The two chains 70 pass around idler pulleys 80 at one turning point and are driven by sprocket wheels 81 at the opposite turning point. A drive sprocket 81 is shown in FIGURES 15 and 16. This sprocket has teeth 82 adapted to enter alternate links of the chains 70 which are disposed in vertical positions. Each tooth is equipped with a shoulder plate 83 to limit the depth of penetration of the tooth into the link opening. The sprocket is driven through a gear reduction unit 84 from a motor, not shown. A drive chain 85 from the gear reduction unit rotates a sprocket wheel 86 on the shaft 87 of sprocket wheel 81.

In passing around the sprocket wheel 81, the drag flights 35 slide on a supporting surface 90 and wrap around a cylindrical drum surface 91 on a half pulley 92 on shaft 87. Half pulley 92 has a flange 93 arranged to overlie the inner portions of flights 35 and prevent the flights from riding up on top of material passing around the turning point if the grating 71 should refuse to take the burden pulled along by the flights. Additionally, it will be observed that the line of pull exerted by chain 70 on each sweep drag is below the level of the bottom edge of drum portion 91 of the pulley 92 whereby the sweep drags are pulled down against the supporting surface 90.

Figure 8:
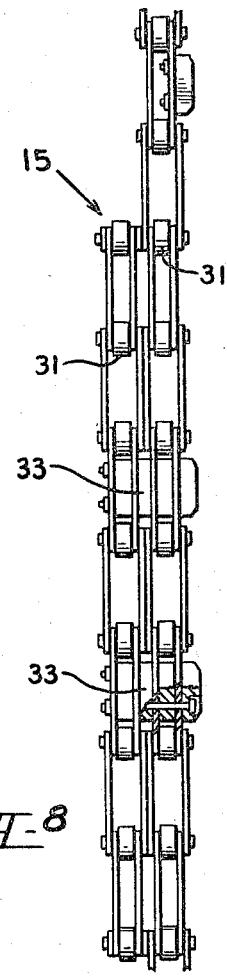
FIGURE 8 is a view on the line 8—8 of FIGURE 7.
Figure 5:
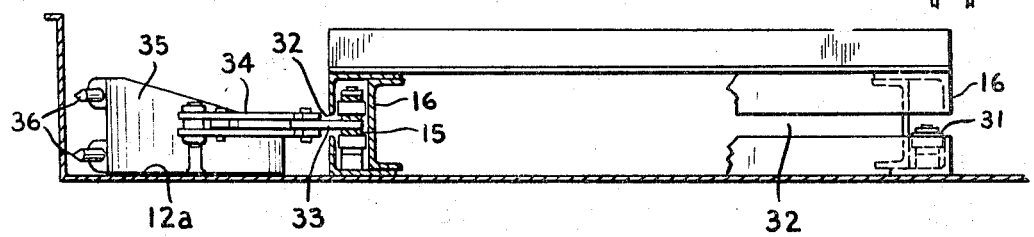
FIGURE 5 is an enlarged view on the line 5—5 of FIGURE 3.

This driving arrangement permits the use of an ordinary logging chain for the pull chain 70, which is less expensive than the type of chain 15 shown in FIGURE 8. The sprocket drive shown in FIGURES 15 and 16 eliminates the caterpillar type of drive and also the chain guides 16 in FIGURE 3. A safety device of the type shown in FIGURES 9 and 10 may be used if necessary. Lugs 33 for drag arms 34 may be mounted on the vertical links of chain 70 instead of the horizontal links as shown in FIGURE 15. This will permit the chain to turn either right or left around the pulleys and sprockets, if desired.

Figure 17:
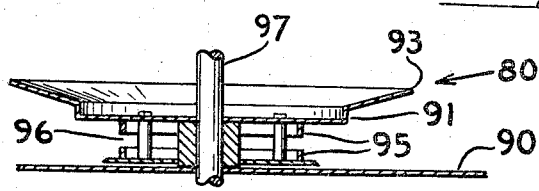
FIGURE 17 is an enlarged sectional view of the idler sprocket shown in FIGURE 13.

FIGURE 17 illustrates the construction of idler pulleys 80 in FIGURE 13. Each idler pulley has a cylindrical drum portion 91 to engage the flights and an upper flange 93 to overlie the flights of the sweep drags as in FIGURE 16. This pulley also includes a pair of spaced-apart, smaller diameter drum portions 95 to engage the vertical links of chain 70, there being a slot 96 between these two drum portions to receive the horizontal links. Pulley shaft 97 is mounted in a suitable conventional spring tension take-up device to remove slack and tension the chain 70.

FIGURES 18 and 19 illustrate another modification which has a pull chain with sweep drags operating in a tunnel under the pile. In this case the pile-supporting surface 100 is roof shaped instead of trough shaped, both sides sloping away from the center. The lower side edges of the supporting surface are provided with low retaining walls 101 to hold a maximum size of pile indicated by the broken line 102.

Pull chain 70 extends under a tunnel-forming roof structure 105. This roof forms a wall having lower edges 106 spaced a distance above the supporting surface 100 as in the case of lower wall edges 68 in FIGURE 14 and lower bin edges 14 in FIGURE 6. The tunnel formed by roof 105 is of sufficient size to admit workmen for the servicing and repair of pull chain 70 and sweep drags 25. When the storage area is utilized to capacity, there is formed a single pile 102 extending between the opposite side walls 101. As the pile becomes depleted it is divided by roof 105 into two piles. A tractor bulldozer may enter the area as indicated at 110 to shift the piles.

Pull chain 70 is trained around two drive sprockets 81 and two idler pulleys 80 in parallelogram pattern as shown. These sprockets and pulleys are located beyond the ends of the pile. Gratings 71 at the drive sprocket turning points receive material from the sweep drags 25 and gratings 76 are located in convenient positions for receiving material moved onto them by the bulldozer 110. These gratings are located over transverse conveyors 72 which discharge onto a longitudinal conveyor 112. Chain 70 may be extended to serve as long a storage yard as desired.

In the arrangement shown in FIGURES 18 and 19, there is no return reach of the pull chain in which the sweep drags 25 are returning empty without burden. In one longitudinal reach 115 of pull chain 70 the drags going in one direction operate on material on one side of the storage area and in the other reach 116 the same drags going in the opposite direction operate on material on the opposite side of the storage area. The drags work in both directions of travel to serve a storage area comparable to that in FIGURE 13 with a single pull chain and half as many sweep drags.

FIGURES 13 and 18 show the sweeping action of drags 25 on the sloping surfaces 65 and 100. When a pile of material is present, the drags follow the edge of the pile and, as the pile becomes depleted, the drags sweep down and follow the retreating edge of the pile until substantially all the material has been removed. The storage areas in FIGURES 13 and 18 may be covered, if desired, for protection against the weather. The storage yards or bins may be arranged in still other ways to carry out the spirit of the invention.

FIGURE 20 shows a modified form of sweep drag 225 for operating on a level supporting surface. Each conveyor flight 226 is rigidly connected with the trailing end of a roller shaft 227 which carries a roller 228 mounted on anti-friction bearings 229. The leading end of each shaft 227 is pivotally connected at 230 with the flight 226 ahead of it. A number of these units are pivotally connected in series to form a drag of the desired length, the roller shaft on the leading end of the drag being pivotally connected with pulling arms 34 on a pull chain as in FIGURES 7 and 15. The lower sides of rollers 228 project a slight distance below the under sides of flights 226 so that the drag as a whole will roll quite freely in a lateral direction.

The last flight 226 has fixedly connected to it, at an oblique angle in trailing position, a shaft 235 for a heavy metal ball 236 which is rotatably mounted on anti-friction bearings 237. The center of ball 236 and, hence, its point of contact with its supporting surface is thereby offset laterally from the line of pull as indicated by arrow 240. This offset distance is indicated by the dimension 241. The forward motion of the drag thus causes the ball to rotate in the direction of arrow 242 and swing the drag to the left on its rollers 228 away from the pulling chain which is connected with the leading end of the drag.

The drag sweeps out with an action similar to that of a paravane mine sweeper in water, assuming an angle 245 relative to the direction of pull 240 as shown in broken lines. The outward sweeping motion of the drag carries the flights 226 into engagement with the edge of a pile of material on a horizontal surface and causes the flights to dig into the material and transport it in the same manner that drags 25 perform on a sloping surface. The drags 225 may also be used on a sloping surface, if desired, in which case the slope could be less than would be required for the drags 25. The drags 225 may be substituted for the drags 25 in the various bin and storage yard arrangements shown in FIGURES 1 to 19, using either level or sloping supporting surfaces for the material.

It will be observed that with both types of drags 25 and 225 the action of centrifugal forces on the drags in passing around the turning points of the pull chain is beneficial rather than detrimental. The centrifugal forces act in outward directions to assist in swinging the drags away from the pull chain and toward the pile of material. Hence, centrifugal forces do not impose a limitation on the speed of the conveyor.

Having now described my invention and in what manner the same may be used, what I claim as new and desire to protect by Letters Patent is:

1. A conveyor system for material comprising:
   a supporting surface upon which a mass of said material is positioned,
   a sweep drag comprising an elongated member,
   means engaging said sweep drag by one end thereof and moving the same in a substantially straight path on said surface alongside said mass of material,
   the opposite end of said drag being movable toward and away from said path,
   and means for causing said opposite end of said drag to move away from said path and toward said mass of material so as to engage and remove material from said mass as said drag is moved along said mass,
   said last means comprising an inclination of said supporting surface from horizontal so that said surface slopes away from said straight path, whereby said opposite end of said drag is moved away from said path and toward said mass of material by the force of gravity.

2. A system as defined in claim 1, including a circular body swivel mounted on said opposite end of said drag adapted to roll and assist in pulling the drag down said sloping surface.

3. A system as defined in claim 2, said sweep drag being flexible.

4. A conveyor system for material comprising:
   a supporting surface upon which a mass of said material is positioned,
   a sweep drag comprising an elongated member,
   means engaging said sweep drag by one end thereof and moving the same in a substantially straight path on said surface alongside said mass of material,
   the opposite end of said drag being movable toward and away from said path,
   and means for causing said opposite end of said drag to move away from said path and toward said mass of material so as to engage and remove material from said mass as said drag is moved along said mass,
   said last means comprising a circular body on said opposite end of said drag adapted to roll on said surface, said body being mounted for rotation on an axis which is oblique to the direction of said straight path so that the body rolls away from said path and toward said mass of material as the drag is moved by said engaging means.

5. A system as defined in claim 4 including additional rollers on said drag intermediate its ends.

6. A conveyor system for material comprising:
   a supporting surface upon which a mass of said material is positioned,
   a sweep drag comprising an elongated member,
   means engaging said sweep drag by one end thereof and moving the same in a substantially straight path on said surface alongside said mass of material,
   the opposite end of said drag being movable toward and away from said path,
   and means for causing said opposite end of said drag to move away from said path and toward said mass of material so as to engage and remove material from said mass as said drag is moved along said mass,
   including a discharge grating in the path of said drag, a vertically movable plate above said grating extending over the path of said drag, and a switch for stopping the movement of said engaging means arranged for actuation by said plate.

7. A conveyor system for material comprising a supporting surface upon which a mass of said material is positioned, a sweep drag comprising an elongated member, and means pivotally engaging said sweep drag by one end thereof and moving the same in a path of travel on said surface alongside said mass of material, said surface sloping away from said path of travel causing the trailing end of said drag to swing by gravity away from said moving means and impact forcibly against said material so as to disengage and remove material from said mass as said drag is moved along said mass.

8. A system as defined in claim 7, said sweep drag being flexible.

9. A conveyor system for material comprising an endless chain arranged for travel around a plurality of turning points, means for driving said chain around said turning points, said chain having a working reach and a return reach between said turning points, a supporting surface for a mass of said material adjacent said working reach, a flexible sweep drag having a leading end connected with said chain for movement of the drag on said surface and a free trailing end, and means for causing said trailing end of said drag to swing away from said chain and impact forcibly against said material so as to engage and remove material from said mass as said drag is pulled along by said chain in said working reach, said drag wrapping itself around said turning points alongside said chain as the drag is pulled around the turning points, and said drag traveling alongside said chain in said return reach of the chain.

References Cited

UNITED STATES PATENTS

| | | | |
|---|---|---|---|
| 1,232,051 | 7/1917 | Kuhn | 198—170 |
| 1,903,488 | 4/1933 | Stibbs | 198—203 |
| 1,960,719 | 5/1934 | Stibbs | 198—203 |
| 2,676,696 | 4/1954 | Gerhartz. | |
| 2,717,703 | 9/1955 | Kull et al. | 214—17 |
| 3,011,658 | 12/1961 | Peterson | 214—10 |
| 984,693 | 2/1911 | Michener | 198—170 XR |
| 1,116,406 | 11/1914 | Fleischer | 198—170 XR |
| 1,671,950 | 5/1928 | Necheff | 198—170 |

FOREIGN PATENTS

| | | |
|---|---|---|
| 461,682 | 6/1928 | Germany. |
| 1,076,565 | 2/1960 | Germany. |
| 869,758 | 6/1961 | Great Britain. |
| 999,958 | 7/1965 | Great Britain. |

ALBERT J. MAKAY, *Primary Examiner.*

U.S. Cl. X.R.

198—171; 214—17